Figure 1:
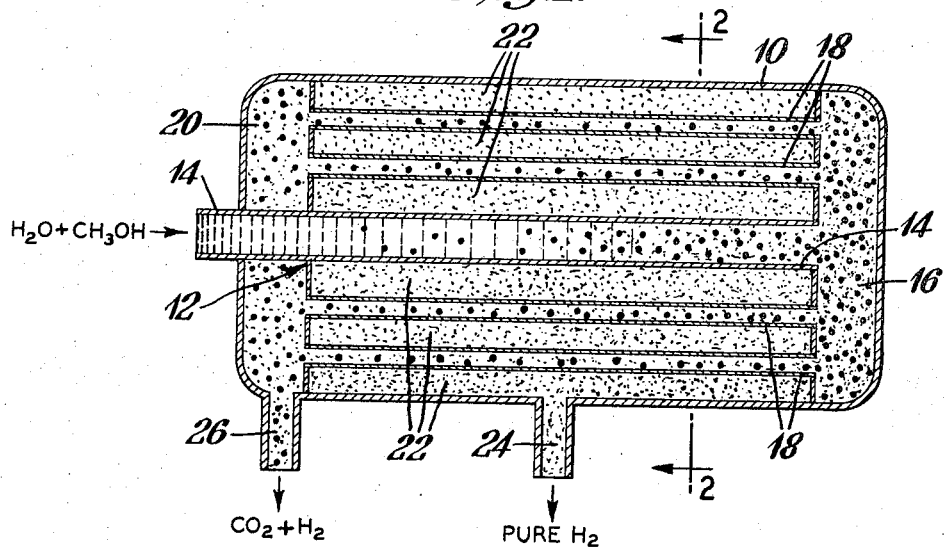

Aug. 29, 1967  K. V. KORDESCH  3,338,681

APPARATUS FOR HYDROGEN GENERATION

Filed Dec. 18, 1963

INVENTOR
KARL V. KORDESCH

BY
ATTORNEY

United States Patent Office 3,338,681
Patented Aug. 29, 1967

3,338,681
APPARATUS FOR HYDROGEN GENERATION
Karl V. Kordesch, Lakewood, Ohio, assignor to Union
Carbide Corporation, a corporation of New York
Filed Dec. 18, 1963, Ser. No. 331,589
4 Claims. (Cl. 23—288)

The present invention relates to apparatus for hydrogen generation and, more particularly, to such apparatus based on catalyzed hydrocarbon reforming principles and employing permeation-separation means for removing gaseous hydrogen from the mixed stream of reaction products.

It has long been recognized that the following are desired objects in connection with high heat value hydrogen generators such as are employed in conjunction with hydrogen fuel cells: capability of providing high purity hydrogen; high throughput capacity as against the size, weight and cost of the generator; and high over-all thermal efficiency.

Heretofore, a wide variety of catalytic reformer systems have been suggested for providing the conversion of hydrocarbon fuels to reaction products high in hydrogen. In addition, many separation systems have been suggested for separation of high purity hydrogen from the reaction products. A typical separation apparatus of this type is disclosed in U.S. Patent No. 2,961,062 by the permeation-separation of hydrogen from hydrogen-containing gaseous mixtures of the type produced by catalytic reformers.

Such successive catalytic reformer-separation operations have provided an over-all hydrogen generation operation which, although capable of supplying hydrogen gas of high purity, has had serious limitations as to throughput capacity, thermal efficiency, size, weight and cost.

It is, accordingly, the prime object of the present invention to provide a hydrogen generator having maximum throughput capacity and thermal efficiency together with minimum size, weight and cost.

Other aims and advantages of the invention will be apparent from the following description and appended drawings.

In accordance with the present invention, a hydrogen generator is provided capable of forming, separating and supplying from a unitary apparatus, pure gaseous hydrogen of high heat value.

The inventive hydrogen generator comprises reformer bed means for effecting the catalytic conversion of a gaseous hydrocarbon-containing stream to gaseous hydrogen and other reaction products, inlet conduit means communicating with the bed means for supplying the gaseous hydrocarbon-containing stream, first manifold means communicating with the outlet end of the bed means, hydrogen permeation-separation conduit means positioned around the bed means and communicating with the first manifold means, hydrogen gas outlet means enclosing the bed means and hydrogen permeation-separation conduit means for collecting and supplying to outlet conduit means separated hydrogen gas, and second manifold means communicating with the outlet of the hydrogen permeation-separation conduit means for collecting and supplying to exit means a gas stream containing the other products of the catalytic reaction.

The unitary apparatus of the invention, in its ability to integrate the reforming and permeation-separation operations of the prior art into a single apparatus, results in increasing the thermal efficiency as well as in reducing the size, weight and cost of the over-all apparatus.

Figure 2:
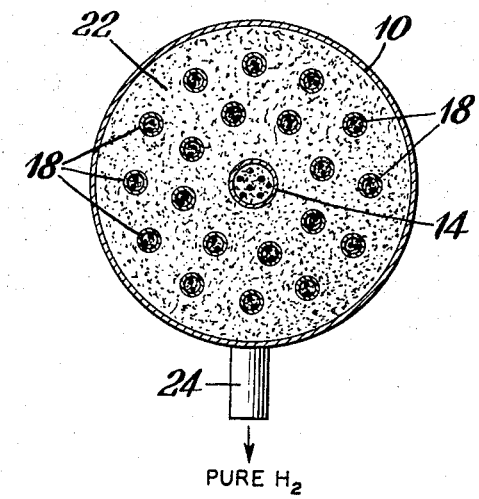

In the appended drawings:

FIG. 1 is an elevational cross-sectional view of apparatus for hydrogen generation embodying the invention; and FIG. 2 is a side cross-sectional view of such apparatus, taken along the line 2—2 of FIG. 1.

Referring specifically to the figures of the drawings, a unitary hydrogen generator is provided comprising an outer vessel 10 containing inner reformer bed means 12 for effecting the catalytic conversion of a gaseous hydrocarbon-containing stream. The bed is contained in conduit 14 but is not shown therein in the figures of the drawings in order that a graphical representation of the gas composition present at various points throughout the generator may be set forth. As there shown, an inlet gas stream containing water and methanol is introduced into conduit 14 (the composition in such inlet gas mixture being represented as a series of dash lines). In its passage through conduit 14, this mixture reacts in the presence of the catalyst bed to provide reaction products containing primarily carbon dioxide and hydrogen. The carbon dioxide component of gaseous product is represented in the drawing by heavy dots, while hydrogen component of the gaseous product is represented by fine dots.

This gaseous reaction product mixture discharges from the downstream end of conduit 14 into first manifold means 16 which, in turn, communicates with a plurality of hydrogen permeation-separation conduit means 18 which are positioned around conduit means 14 and, at their discharge ends, commonly communicate with second manifold means 20.

As may be seen from the graphical representation of the drawings, a high percentage of the gaseous hydrogen produced by the catalytic reforming reaction is separated from the other reaction products by permeation through the walls of the permeation-separation conduit means 18. This hydrogen is passed into the common internal space 22 defined by the communicating interior of outer vessel 10. This pure hydrogen then passes from the generator through outlet conduit 24. The non-permeated component of the reaction products is passed from second manifold means 20, through exit means 26, to either be vented to the atmosphere or carried to a point where it can be, if desired, burned in the presence of an oxidant (such as air) to provide heat capable of utilization for pre-heating purposes.

While the description hereinabove has dealt with the steady state operation of the apparatus of the invention, it is to be understood that the catalytic reforming reaction is endothermic and that heat must be supplied to the reformer bed for start-up. This may be accomplished by effecting a combustion of a fuel, such as methanol, and an oxidant, such as air, in the reformer bed until the required temperature is developed and then introducing the reactant mixture of water and methanol to carry out the hydrogen-producing reaction.

Whereas the drawings have been described in operation with respect to methanol and water, a wide variety of other common hydrocarbon fuels, such as, for example, ethanol, propane, butane, gasoline, kerosene, diesel oil, etc., may alternatively be employed.

Suitable catalytic reforming bed compositions which may be employed in the apparatus of the invention are well known in the art, such as, for example, 1% palladium supported on an alumina carrier. Reforming reactions employing such catalysts may be carried out at selected temperatures, about 650° F., depending upon the specific feed stocks, other variables employed and yields desired. All of such reaction conditions are well within the knowledge of the art.

The structure and composition of permeation-separation conduit means 18, while generally within the knowledge of the art, are critical to the success of the hydrogen separation. Such hydrogen separation membranes preferably are composed of palladium-containing metal foils on porous supporting substrates. Generally, foils of palladium metal or alloys thereof (such as 73% Pd—27% Ag) of 0.3 to 2.0 mils thick are supported on a substrate such as stainless steel to form tubes. Alternatively, palladium metal or alloy tubes may be employed.

It has been found that the permeation-separation conduit means of the apparatus of the present invention will permit removal of approximately 70% of the hydrogen from the reaction product stream, which is run through such conduits at pressures of about 300 p.s.i. Remaining reaction products, including approximately 30% of the hydrogen and any carbon monoxide, carbon dioxide and unreacted gaseous hydrocarbon, will not permeate and will be passed from the reformer bed means as a mixed gas stream.

If desired, fuel and water boiler units may be placed on the periphery of the hydrogen generator of the invention in order to take advantage of the transfer of any waste heat which may be obtainable.

In an example of the operation of apparatus embodying the invention, a steam and methanol mixture at 350° C. and 300 p.s.i. is provided to the catalytic reaction bed of the generator. The catalytic reaction bed is composed of 1% palladium metal supported on an alumina carrier. Of the hydrogen produced therein, 70% is removed from the reaction product mixture through the permeation-separation conduits which are composed of hydrogen-permeable palladium tubes. The remaining 30% hydrogen and other reaction products are utilized through heat exchange means to pre-heat the fuel being fed to the catalytic reaction bed. It has been calculated that, in this manner, approximately 50% of the heat energy available in exhaust gas is utilized.

It has been found that the required pressure differential across the walls of permeation-separation conduit means 18 may be accomplished in a variety of ways, including the application of a positive inlet fuel pressure to inlet condut 14, the development of an internal pressure through super heating of the reactants within the generator, the application of a vacuum to outlet hydrogen conduit 24, or by a combination of the above.

What is claimed is:

1. A unitary hydrogen generator for providing high heat value gaseous hydrogen comprising: (1) reformer bed means for effecting the catalytic conversion of a gaseous hydrocarbon-containing stream to gaseous hydrogen and other reaction products; (2) inlet conduit means communicating with said bed means for supplying said gaseous hydrocarbon-containing stream; (3) first manifold means communicating with the outlet end of said bed means; (4) hydrogen permeation-separation conduit means positioned around said bed means, communicating with said first manifold means, and communicating with said bed means only through said first manifold means; (5) hydrogen gas outlet means enclosing said bed means and said hydrogen permeation-separation conduit means for collecting and supplying to outlet conduit means separated hydrogen gas; and (6) second manifold means communicating with the outlet of said hydrogen permeation-separation conduit means for collecting and supplying to exit means a gas stream containing the other products of said catalytic reaction.

2. The unitary hydrogen generator in accordance with claim 1, wherein said hydrogen permeation-separation conduit means are composed of palladium-containing material.

3. A unitary hydrogen generator for providing high heat value gaseous hydrogen comprising: (1) elongated reformer bed means for effecting the catalytic conversion of a gaseous hydrocarbon-containing stream to gaseous hydrogen and other reaction products; (2) inlet conduit means communicating with said bed means for supplying said gaseous hydrocarbon-containing stream; (3) first manifold means communicating with the outlet end of said bed means; (4) a plurality of elongated hydrogen permeation-separation conduit means positioned around said bed means, communicating with said first manifold means, and communicating with said bed means only through said first manifold means; (5) hydrogen gas outlet means enclosing said elongated bed means and said plurality of hydrogen permeation-separation conduit means for collecting and supplying to outlet conduit means separated hydrogen gas; and (6) second manifold means communicating with the outlet ends of each of said plurality of hydrogen permeation-separation conduit means and positioned near the inlet end of said elongated bed means for collecting and supplying to outlet means a gas stream containing the other products of said catalytic reaction.

4. The unitary hydrogen generator in accordance with claim 3, wherein said hydrogen permeation-separation conduit means are composed of palladium-containing material.

References Cited

UNITED STATES PATENTS

| 1,124,347 | 1/1915 | Snelling | 55—118 X |
|---|---|---|---|
| 1,951,280 | 3/1934 | Hale et al. | 23—288 X |
| 2,637,625 | 5/1953 | Garbo | 55—16 X |
| 2,940,840 | 6/1960 | Shapleigh | 48—215 |
| 2,961,062 | 11/1960 | Hunter et al. | 55—158 |
| 3,198,604 | 8/1965 | Pfefferle | 23—288 X |

MORRIS O. WOLK, *Primary Examiner.*

JOSEPH SCOVRONEK, *Examiner.*